United States Patent [19]

Marquardt et al.

[11] Patent Number: 5,381,682
[45] Date of Patent: Jan. 17, 1995

[54] APPARATUS AND METHOD OF MANUFACTURING MASONRY FASTENERS

[75] Inventors: Herman W. Marquardt, Whitmore Lake; Herman K. Marquardt, Pinckney, both of Mich.

[73] Assignee: Great Lakes Tool and Machine Co., Milford, Mich.

[21] Appl. No.: 168,685

[22] Filed: Dec. 17, 1993

[51] Int. Cl.$^6$ .............................................. B21H 3/12
[52] U.S. Cl. ............................................ 72/90; 72/469
[58] Field of Search ...................... 72/88, 90, 103, 469

[56] References Cited

U.S. PATENT DOCUMENTS

| | | | |
|---|---|---|---|
| 387,184 | 7/1888 | Rogers | 72/88 |
| 428,498 | 5/1890 | Laundry | 72/469 |
| 446,042 | 2/1891 | Warren | 72/88 |
| 1,973,201 | 9/1934 | Fassinger | 72/88 |
| 3,748,673 | 7/1973 | Anderson | 72/88 |
| 3,803,889 | 4/1974 | Muenchinger | 72/88 |
| 4,996,860 | 3/1991 | Shinjo | 72/88 |

Primary Examiner—Daniel C. Crane
Attorney, Agent, or Firm—Harness, Dickey & Pierce

[57] ABSTRACT

A method and apparatus for manufacturing a masonry fastener having a helical portion. A workpiece is positioned between a pair of tools mounted for relative movement. Both tools have faces defining a plurality of raised and recessed portions that extend generally diagonally thereacross. A frame supports the tools such that the face of one tool generally opposes the face of the other tool face. Relative movement of the tools causes the workpiece to rotate and move across the faces where it is deformed by the interaction of the respective raised and recessed portions of each tool. The result is a masonry fastener having at least a portion of its body formed into a substantially helical shape.

20 Claims, 5 Drawing Sheets

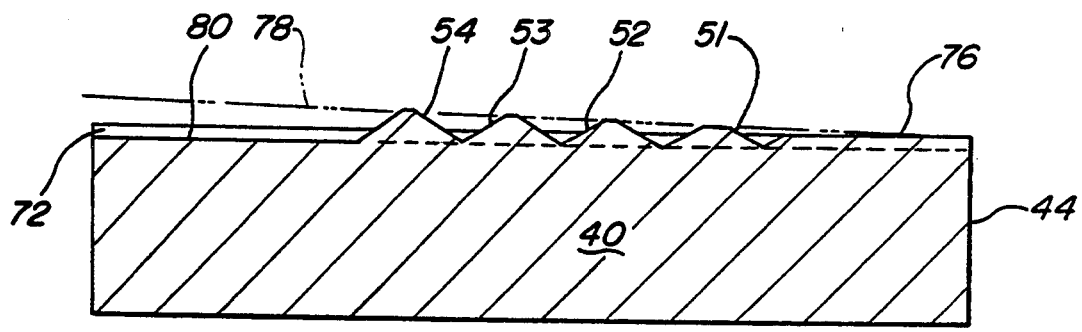
Fig-3
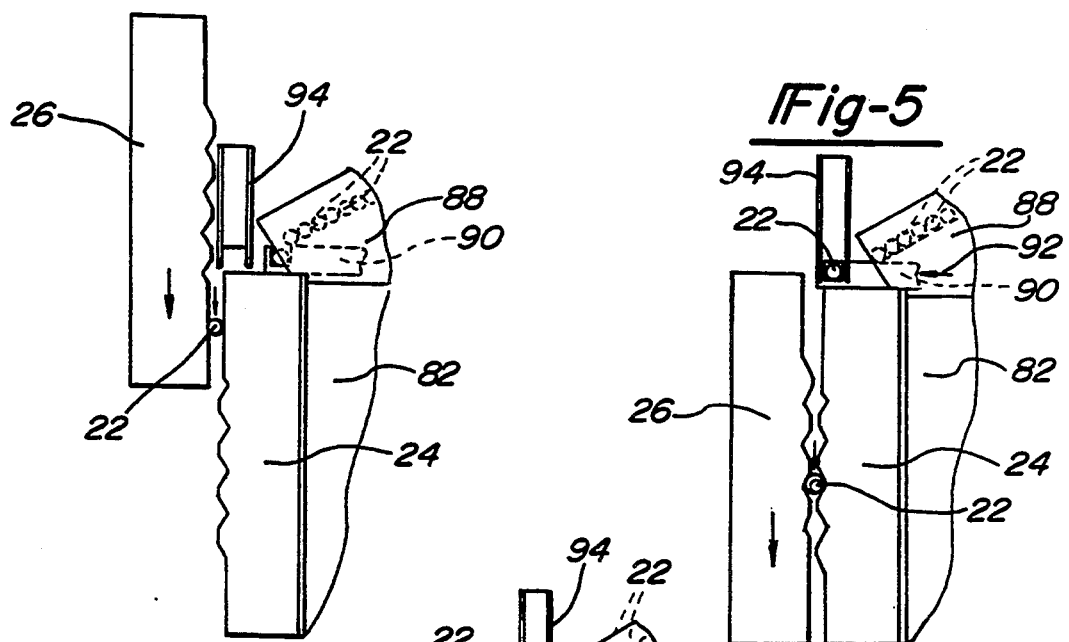
Fig-5
Fig-4
Fig-6

APPARATUS AND METHOD OF MANUFACTURING MASONRY FASTENERS

BACKGROUND AND SUMMARY OF THE INVENTION

This invention generally relates to fasteners. More particularly, the invention relates to an apparatus and method for manufacturing masonry fasteners of the type used to secure structural elements and materials to masonry by forcibly driving the fastener into a hole, pre-drilled within the masonry.

In many instances there is a need to fasten a fixture or structural member to masonry, such as a concrete floor. Various masonry fastening systems are used in the industry including: nails driven directly into the masonry; multiple component expandable anchors used with pre-drilled holes in the masonry; and one piece masonry fasteners driven into a pre-drilled hole in the masonry. An example of the latter type of masonry fastener is described in copending U.S. patent application Ser. No. 918,663, filed Jul. 22, 1992, entitled MASONRY FASTENER, which is commonly assigned to the assignee of the present application.

This invention details an apparatus and method for manufacturing one-piece masonry fasteners which are intended to be driven into holes pre-drilled into the masonry. Masonry fasteners manufactured according to the present invention are constructed from constant diameter wire stock and include a body composed of a straight, constant diameter shank and a helical portion which generally defines a cylinder having a diameter greater than that of the pre-drilled hole with which it is intended to be used. The helical portion or helix of the fastener causes the fastener to rotate as it is driven into the pre-drilled hole. During this rotation, the outermost surface of the helix scores a helical groove into the masonry which defines the wall of the pre-drilled hole. These fasteners exhibit a high retentive force through a combination of features including: the frictional engagement of the fastener with the wall defining the pre-drilled hole; the deformation of the hole wall which creates conformity of the wall with the shape of the fastener; the increased surface contact between the wall and the fastener; the rotational turning of the fastener induced by the helix during attempted removal of the fastener from the hole; and the spring-like force exerted by the fastener on the hole wall as a result of the helix being deflected as the fastener is driven into the hole.

It is therefore an object of this invention to provide both an apparatus and a method for manufacturing a masonry fastener of the above described variety.

The apparatus and method of this invention are capable of manufacturing a masonry fastener having a body which includes a substantially cylindrical shank that terminates in a helix. The apparatus includes a pair of opposing tools or dies, each of which cooperate to define surfaces that clamp a wire stock workpiece between the dies. The face of each die is configured with a number of substantially parallel raised ridges and recessed valley portions oriented so as to extend diagonally across the faces of the dies. Progressing axially across the faces of the dies, it can be seen that ridges and the valleys respectively increase in height and depth relative to the clamping surfaces of the dies. The apparatus is also provided with a mechanism which causes relative movement of the dies with the workpiece clamped therebetween.

According to the method of this invention, the dies are positioned so as to opposingly face one another with their respective ridges and valleys being oppositely oriented from those of the other die. A constant diameter wire stock workpiece is positioned between the dies which cooperate to clamp the workpiece therebetween. With the workpiece clamped between the dies, the dies are axially moved relative to each other. The relative movement of the dies causes the workpiece to rotate or roll between the dies and move generally from the lead ends of the dies, over the ridges and valleys, to the trailing end of the dies where the finished masonry fastener is ejected. In moving across the face of the dies, the leading ridge of one die causes the workpiece to be deformed into the leading valley of the opposing die. After rolling across the leading ridge and valley of the dies, a helix will have been generally formed into the workpiece. The progressive increase in height and depth of the successive ridges and valley further deforms the workpiece and increases the amplitude of the helix while smoothing out the finish on the resulting fastener. After the finished masonry fastener has been ejected from between the dies, the dies return to their starting positions as another workpiece is inserted between them beginning the production of another masonry fastener.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a sectional view taken substantially along line 3—3 in FIG. 2 of the die shown therein;

FIG. 4 illustrates a workpiece being fed between the two dies at the beginning of the production of a masonry fastener with the apparatus and method of the present invention;

FIG. 5 shows the production of a masonry fastener by the apparatus and method of the present invention wherein the fastener is partially formed as a result of relative movement between the dies;

FIG. 6 illustrates a masonry fastener having been formed by the apparatus and method of the present invention and being ejected from between the dies as a finished product;

DETAILED DESCRIPTION OF THE PREFERRED EMBODIMENTS

Figure 1:
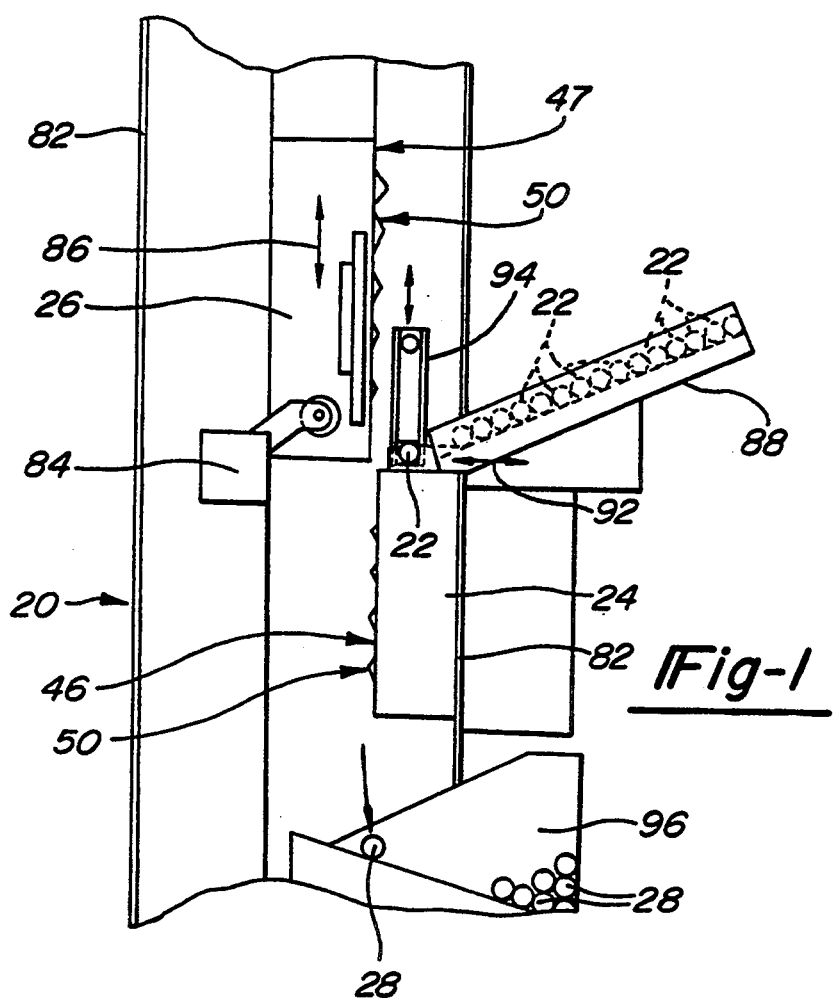
FIG. 1 is a side elevational view with portions broken away showing an apparatus embodying the principles of the present invention for producing masonry fasteners.

Referring now to the drawings, an apparatus for manufacturing a masonry fastener according to the method of the present invention is generally illustrated in FIG. 1 and designated at 20. Generally, workpieces 22 of round metal stock, pre-cut to the appropriate length, are individually fed to the apparatus 20 where they are clamped between a fixed die 24 and a movable die 26. As the dies 24 and 26 move relative to each other, the clamping action causes the workpiece 22 to rotate and roll across the surface of the die where it is deformed. Having being rolled across the working faces of the dies 24 and 26, the finished product or masonry fastener 28 is ejected from between the dies 24 and 26.

Figure 10:
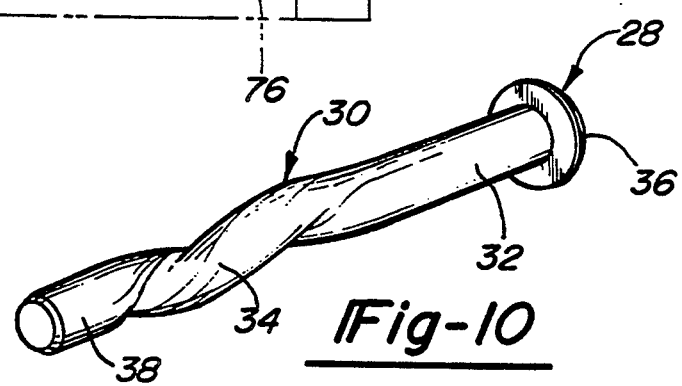
FIG. 10 is a perspective view of a masonry fastener as formed by the method and apparatus of the present invention.

In order to provide for a more clear understanding of the method and apparatus 20 of the present invention, the finished masonry fastener 28 itself will be first discussed in some detail. As seen in FIG. 10, a masonry fastener 28 formed according to the method and with the apparatus 20 of the present invention is formed from round metal stock and includes a body 30 having a constant diameter shank portion 32 and a helical portion or helix 34. A head 36 is formed on one end of the body 30, generally adjacent to the shank 32, while the opposing end of the body 30 is referred to as a toe 38. While the helix 34 is illustrated as having only one full rotation, it will be understood from the following discussion that the helix 34 can be formed with less than or greater than one full turn. Also, the amplitude or pitch of the helix 34 can be varied as desired.

The unique shape and structure of the masonry fastener 28 is imparted to the workpiece 22 as the workpiece 22 rolls across and between the opposing faces of the dies 24 and 26. Thus, it is the particular shape of the surfaces of the dies 24 and 26, and their cooperation and interaction with one another, which enables the manufacturing of the masonry fastener 28. The dies 24 and 26 are substantially similar to one another and include a significant number of common features. For this reason, only one die, the fixed die 24, is illustrated and discussed in significant detail.

Figure 2:
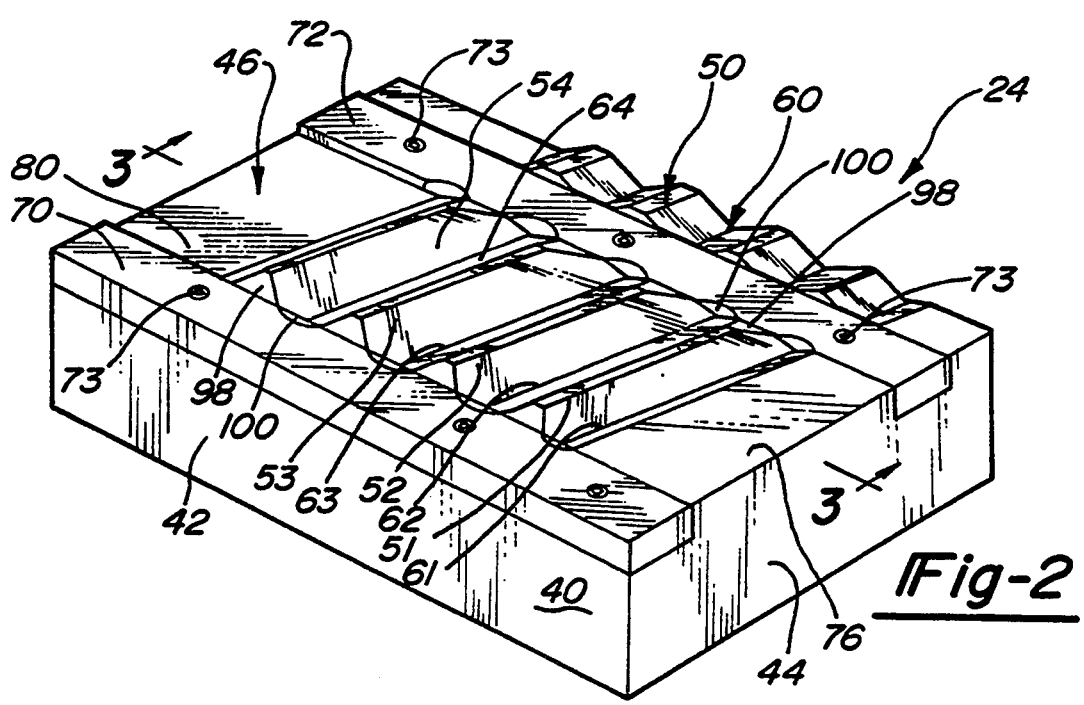
FIG. 2 is a perspective view of one die utilized in manufacturing masonry fasteners with the apparatus and method of present invention.

As seen in FIG. 2, the die 24 is illustrated as having a rectangular body 40, the length of which is greater than its width as illustrated by its side 42 and its end 43. The die body 40 includes a face 46 which is machined so as to exhibit a number of substantially parallel raised ridge portions 50 and recessed valley portions 60. In the illustrated embodiment, four ridges 50 and four valleys 60 are illustrated, it being understood that a greater or lesser number of ridges and valleys could be provided. However, a greater number of ridges and valleys is preferred over a lesser number.

The ridges 50 and valleys 60 are machined into the face 46 so as to extend diagonally across its width. The face 46 of the die 24 is also machined to include two channels 74 which receive a pair of hardened inserts 70 and 72 that extend the length of the die body 40. As illustrated, one of the inserts, insert 70, is provided so as to extend along and correspond with the edge or side 42 of the die body 40. The other insert, insert 72, is set back a distance from the opposing side of the die body 40. However, the insert 72 could also be positioned immediately adjacent to the opposing side of the die body 40.

The inserts 70 and 72 are formed from a hardened material, such as steel, and are screwed, riveted, or otherwise secured, as designated at 73, within channels 74 to the die body 40. as further discussed below, the upper surfaces of the inserts 70 and 72 define clamping surfaces which oppose corresponding clamping surfaces on the movable die 26.

Proceeding longitudinally or axially from the leading end 44 of the die 24, the face 46 includes a raised or leading plateau 76 which is the same height as the clamping surfaces defined by the inserts 70 and 72. After the leading plateau 76, the face 46 includes a first or lead valley 61 which terminates in a lower apex and a first or lead ridge 51 which terminates in a planar upper apex. The lead valley 61 and ridge 51 are followed by a second valley 62 and ridge 52, a third valley 63 and ridge 53 and a fourth valley 64 and ridge 54 which also terminate in upper and lower apexes. As best seen in FIG. 3, each ridges 51, 52, 53 and 54 successively or progressively increases in height, shown by dashed line 78, relative to the leading plateau 76 and the immediately preceding ridge. The exact size of the height increase will depend upon the desired configuration of the masonry fastener 28 and typically will not vary greater than several thousandths of an inch from one ridge to the next. After the last or fourth ridge 54, the face 46 terminates in a trailing plateau 80 which forms a recessed surface below that defined by the leading plateau 76 and the clamping surfaces of the inserts 70 and 72.

As mentioned above, the movable die 26 has a configuration similar to that of the fixed die 24. However, the movable die 26 is longer than the fixed die 24 and is provided with a greater number of ridges and valleys, such as five, then the fixed die 24. Because of the relative movement between the dies 24 and 26, the longer length of the movably die 26 ensures complete deformation of the workpiece 22 into the masonry fastener 28.

The fixed die 24 is mounted to a housing, frame or other member 82 of the apparatus 20 so that it is longitudinally oriented in a generally vertical direction with the leading end 44 positioned towards the top and the face 46 directed generally horizontally. The movable die 26 is positioned to face the fixed die 24 and is also supported by the frame 82. However, the movably die 26 is carried on a movable support 84 mounted to the frame 82. As such the movable support 84 can be of a conventional design. The movable support 84 is in turn driven for substantially vertical movement, as indicated by arrows 86, by an actuator (not shown) such as a hydraulic or pneumatic cylinder. The range of movement experienced by the movable support 84 and the movable die 26 is such that as the movable die 26 is moved, its entire face 47, will move past the face 46 of the fixed die 24 in close proximity thereto.

The movable die 26 is positioned so that its leading plateau, designated at 77, is located at its lower end and such that its ridges 50 progressively increase in height moving up the face 47. Also, the ridges 50 formed on the face 47 of the movable die 26 are oriented diagonally opposite of the ridges 46 in the face 46 of the fixed die 24.

Referring now to FIGS. 1 and 4–9, the workpieces 22 are individually fed from a feed hopper 88 into a loading arm 90 which is reciprocated by an actuator (not shown) in the direction of arrow 92. The loading arm 90 individually feeds the workpieces 22 to a push arm 94 which is actuated to position the workpiece 22 between the dies 24 and 26. The workpiece 22 is clamped between the faces 46 and 47 of the dies 24 and 26 by the clamping surfaces of the inserts 70 and 72 and the leading plateaus 76 and 77. As the movable die 26 is downwardly actuated by the movable member 84, the relative movement of the dies 24 and 26 cause the clamped workpiece 22 to roll and rotate.

Figure 7:
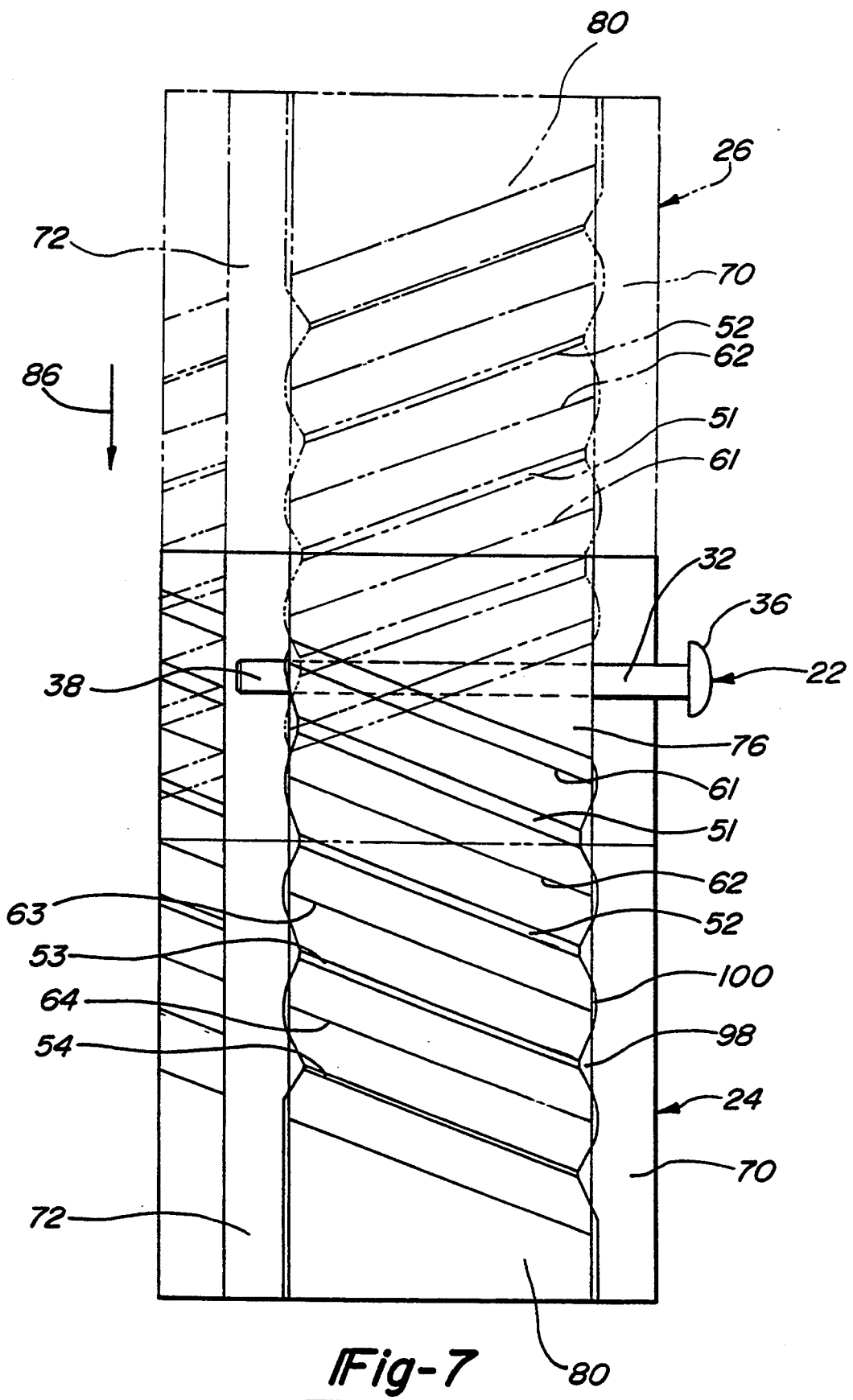
FIG. 7 is a plan view of the die illustrated in FIGS. 2 and 3 showing the movable die in phantom moving thereover and forming a masonry fastener with the apparatus and method of the present invention.
Figure 8:
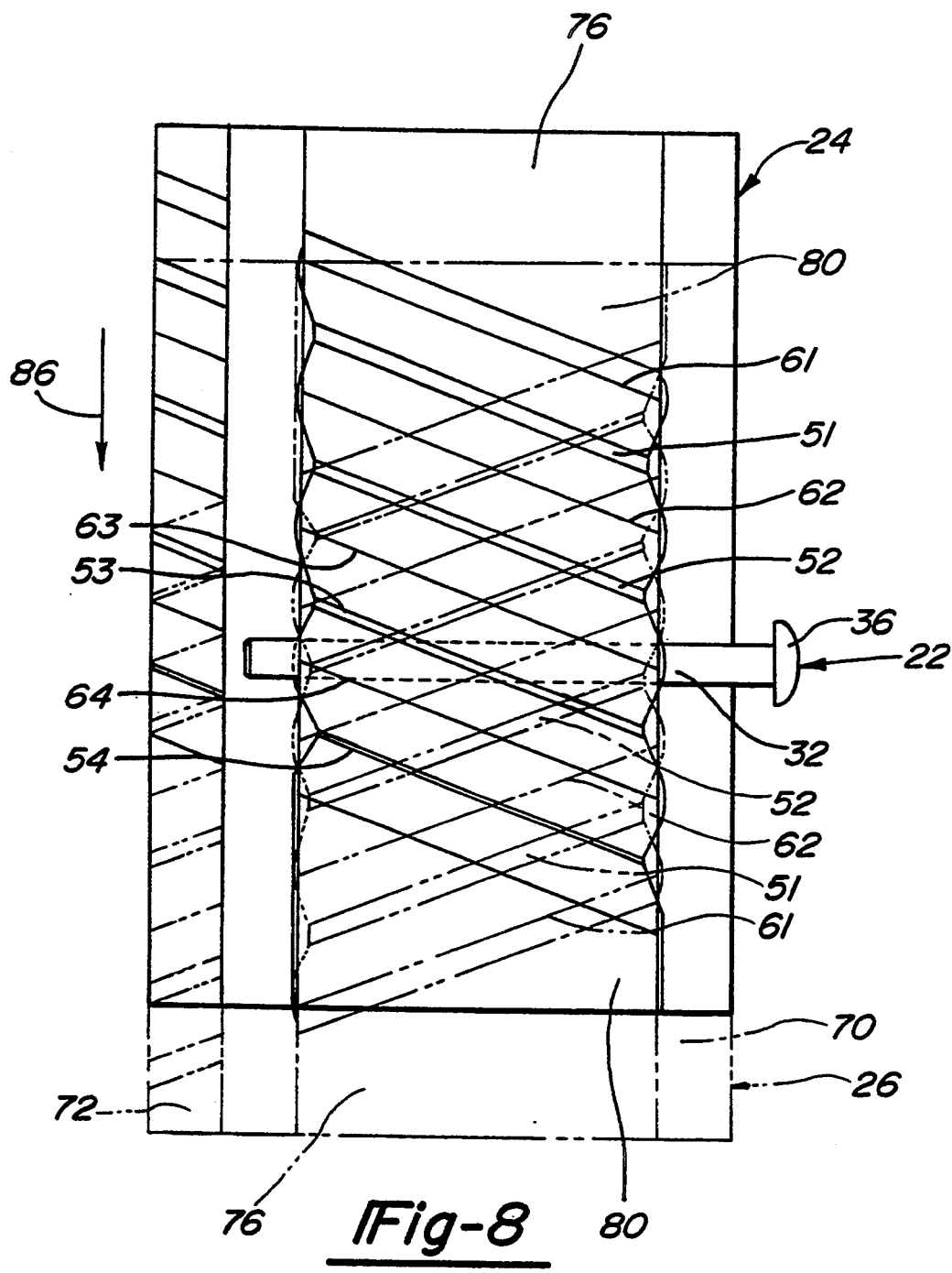
FIG. 8 is a view similar to that of FIG. 7 showing the dies in their relative positions with the masonry fastener approximately half formed by the method and apparatus of the present invention.

The timing and positioning of the workpiece 22 between the dies 24 and 26 is critical to the proper functioning of the apparatus 20 and formation of the masonry fastener 28. The workpiece 22 needs to be clamped between the faces 46 and 47 such that as it rolls therebetween, it will reach the lead valley 61 of the fixed die 24 at the time the lead ridge of the movable die 26 begins to pass over the lead valley 61. The proper positioning of the workpiece 22 between the movable die 26 and the fixed die 24 is generally illustrated in FIG. 7 where the lead ridge 51 of the movable die 26 (shown in phantom) is beginning to pass over the lead valley 61 of the fixed die 24.

If the rolling workpiece 22 reaches the lead valley before or after the corresponding positioning of the movable die 26, the workpiece 22 will not properly deform. Under these conditions, as the lead ridge of the movable die 26 passes over the lead ridge 51 of the fixed die 26, the workpiece 22 will "kick out" from between the dies 24 and 26. Similarly, the workpiece may kick out from between the dies 24 and 26 if dies 24 and 26 are misaligned or if an improper amount of clamping force is exerted between the dies 24 and 26. For this reason, the dies are adjustable mounted to the frame 82 of the apparatus 20.

Because the workpiece 22 remains clamped at its toe 38 and shank 32 between the opposing inserts 70 and 72 over the length of the fixed and movable dies 24 and 26, the workpiece 22 will continue to roll in response to the relative movement of the dies 24 and 26 even as the workpiece 22 undergoes deformation as a result of the ridges and valleys 50 and 60 of the fixed and movable dies 24 and 26 passing over one another.

As the workpiece 22 is completely rolled over the lead ridge 51 and valley 61, a mild helix 34 is formed in the body 30 of the workpiece 22. The increased height of the successive ridges 50, relative to the clamping surfaces, results in the helix 34 of the workpiece 22 undergoing increasing deformation as the movable die 26 progresses past the fixed die 24, thereby increasing the pitch or amplitude of the helix 34. Instead of increasing the height of each successive ridge 50, the same result could be achieved by progressively increasing the depth of the valleys 60, relative to the clamping surfaces, which would also result in an effective increase the height of the ridges 50.

By varying parameters such as the diameter of the workpiece 22, the axial spacing between each successive ridge 50, the height of the successive ridges 50, as well as the angle formed by the diagonal orientation of the ridges 50, the precise shape of the helix 34 can be varied to have less than one full turn, more than one full turn, an increased or a decreased pitch. For example, for a workpiece 22 of a given diameter, by increasing the angle at which the ridges 50 extend diagonally across the width of the dies 24 and 26, an increase in the number of turns exhibited by the helix 34 will result.

Figure 9:
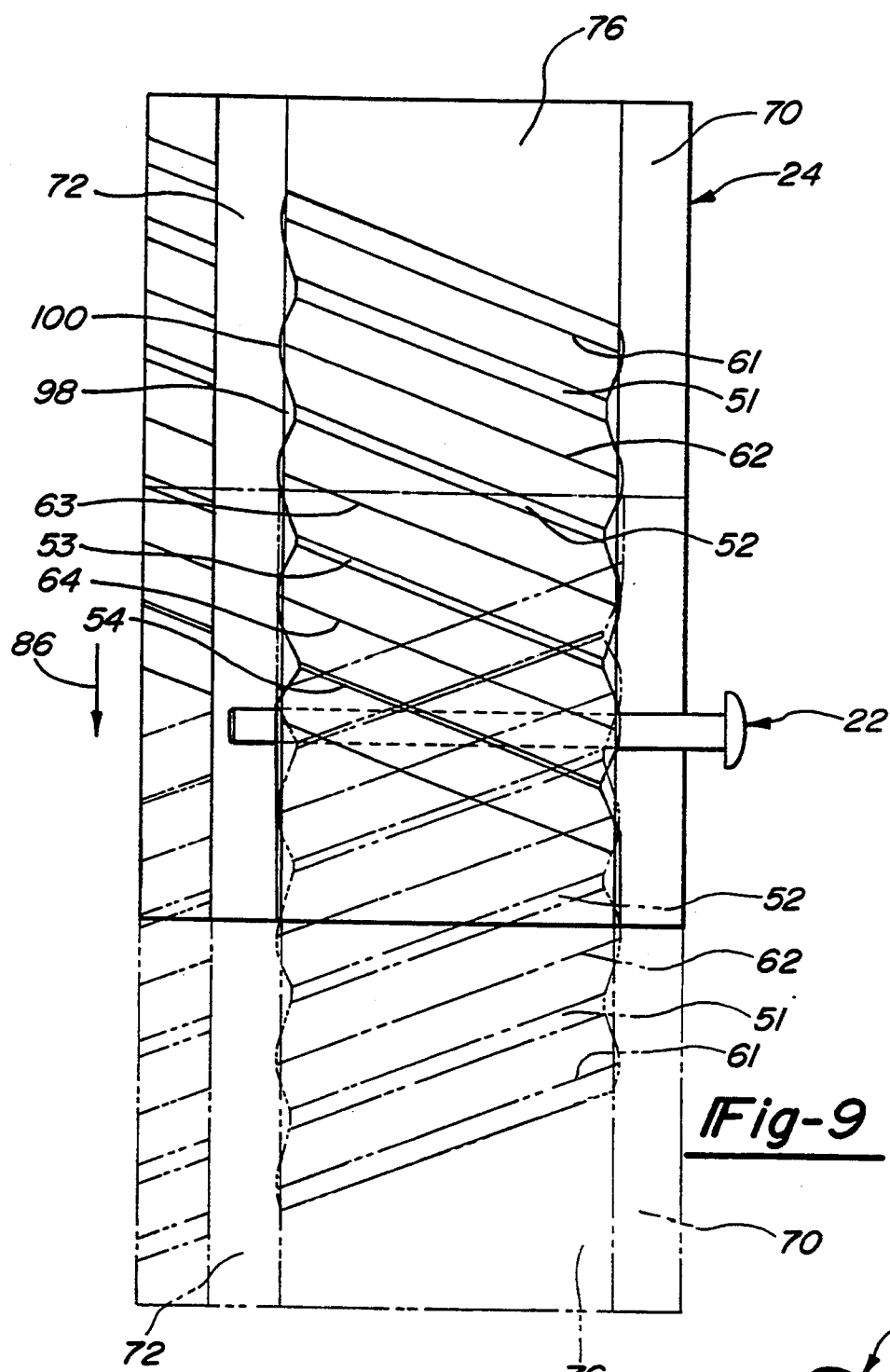
FIG. 9 is a plan view similar to that seen in FIGS. 7 and 8 illustrating the relative position of the die generally before the masonry fastener is ejected from between the dies.

Once the masonry fastener 28 has been rolled past the final ridge 50 of both dies and the movable die 26 is generally positioned below the fixed die 24 (as generally seen in FIGS. 6 and 9), the finished masonry fastener 28 is ejected from between the dies 24 and 26 into a receiving hopper 96.

Applicants have found that a more desirable masonry fastener 28 can be made if the dies 24 and 26 are machined so as to include hips 98 and swales 100 respectively at the ends of each ridge 50 and valley 60 thereby eliminating a sharp corner where the ridges 50 and valleys 60 meet with the inserts 70 and 72. The hips 98 and swales 100 are generally sloped or beveled side surfaces with respect to the ridges 50 and valley 60. As such, the hips 98 are formed directly in to the ridges 50 while the swales 100 are machined into the inserts 70 and 72.

If desired, a raised rib (not shown) could be formed to follow along the top of the helix 34 of the masonry fastener 28 by providing for a depression (not shown) in the top of each ridge as well as a projection (not shown) in the bottom of each valley 60. This rib would further enable the masonry fastener 28 to score the wall defining the hole in the masonry further increasing the contact surface area between the masonry fastener 28 and the hole and the retentive capabilities of the masonry fastener 28.

While the above description constitutes the preferred embodiments of the present invention, it will be appreciated that the invention is susceptible to modification, variation and change without departing from the proper scope and fair meaning of the accompanying claims.

I claim:

1. A method for manufacturing masonry fasteners, said method comprising the steps of:

providing a first die tool having a planar first tool face with a plurality of raised and recessed portions defined relative to said first tool face, said raised and recessed portions extending generally diagonally and substantially parallel to one another across said first tool face, said raised and recessed portions being formed by planar surfaces and respectively terminating in an upper apex and a lower apex, said upper apex defined by a planar surface, said lower apex defined by an intersection of two converging planar surfaces, said first tool also including clamping portions defining a planar clamping surface, said clamping portions being planar with said first tool face;

providing a second tool having a planar second tool face with a plurality of raised and recessed portions defined relative to said second tool face, said raised and recessed portions of said second tool extending generally diagonally and substantially parallel to one another across said second tool face, said raised and recessed portions being formed by planar surfaces and respectively terminating in an upper apex and a lower apex, said upper apex defined by a planar surface said lower apex defined by an intersection of two converging planar surfaces, said second tool also including clamping portions defining a planar clamping surface, said clamping portions being planar with said second tool face;

positioning said first tool and said second tool relative to one another such that said first tool face generally opposes said second tool face;

providing a workpiece having a substantially cylindrical body and a pair of ends;

positioning said workpiece between said first tool and said second tool;

clamping said workpiece between said clamping portions of said first tool and said clamping portions of said second tool;

inducing relative longitudinal movement between said first tool and said second tool while said workpiece is clamped therebetween, said relative longitudinal movement causing said workpiece to rotate and move across said first tool face and said second tool face while being clamped therebetween;

deforming said body into a substantially helical shape over at least a portion of said body's length and forming said masonry fastener as a result of the interaction of said raised and recessed portions of said first tool with said raised and recessed portions of said second tool; and ejecting said masonry fastener from between said first tool and said second tool.

2. The method for manufacturing masonry fasteners as set out in claim 1 wherein at least some of said raised portions of said first tool and at least some of said raised portions of said second tool have different heights.

3. The method for manufacturing masonry fasteners as set out in claim 1 wherein said raised portions of said first tool and said raised portions of said second tool successively increase in height.

4. The method for manufacturing masonry fasteners as set out in claim 1 wherein said first tool and said second tool each include a pair of spaced apart, planar clamping surfaces extending lengthwise therealong.

5. The method for manufacturing masonry fasteners as set out in claim 4 wherein said raised portions and said recessed portions of both said first tool and said second tool extend between said pair of spaced apart, planar clamping surfaces.

6. The method for manufacturing masonry fasteners as set out in claim 1 further comprising the step of clamping said workpiece at said ends of said workpiece, said ends being engaged between said clamping surfaces of said first tool and said second tool.

7. The method for manufacturing masonry fasteners as set out in claim 1 wherein said raised and recessed portions of said first tool extend in a direction diagonally opposite of said raised and recessed portions of said second tool when said first tool face is positioned so as to oppose said second tool face.

8. An apparatus for manufacturing a masonry fastener including a body being substantially helical over a portion thereof, said masonry fastener being manufactured from a workpiece having a proximal end, a distal end and a substantially constant diameter body, said apparatus comprising:

a first tool having a planar first tool face with a plurality of substantially parallel raised and recessed portions defined therein relative to said first tool face and extending generally diagonally across said first tool face, said raised and recessed portions being formed by planar surfaces and respectively terminating in an upper apex and a lower apex, said upper apex defined by a planar surface which is generally parallel to said first tool face, said lower apex defined by an intersection of two converging planar surfaces, said first tool also including portions defining a pair of planar clamping surfaces extending longitudinally and being planar with said first tool face;

a second tool having a planar second tool face with a plurality of substantially parallel raised and recessed portions defined therein relative to said second tool face and extending generally diagonally across said second tool face, said raised and recessed portions being formed by planar surfaces and respectively terminating in an upper apex and a lower apex, said upper apex defined by a planar surface which is generally parallel to said second tool face, said lower apex defined by an intersection of two converging planar surfaces, said second tool also including portions defining a pair of planar clamping surfaces extending longitudinally and being planar with said second tool face;

a frame generally supporting said first tool and said second tool, said first tool and said second tool being located relative to one another such that said first tool face generally opposes said second tool face in close relation thereto and such that said raised portions and said recessed portions of said first tool extend in a direction being diagonally opposite from said raised portions and said recessed portions of said second tool;

means for positioning the workpiece between said first tool face and said second tool face in engagement with and between said clamping surface of said first tool and said clamping surface of said second tool; and inducing means for inducing relative longitudinal movement between said first tool and said second tool while the workpiece is positioned therebetween, said relative longitudinal movement causing the workpiece to rotate about its body and move across said first tool face and said second tool face, whereby interaction of said raised portions and said recessed portions of said first tool face and said second tool face generally deform the body of the workpiece into a substantially helical shape over at least a portion of the body's length to form said masonry fastener.

9. The apparatus set out in claim 8 wherein said apparatus further comprises a supply bin for providing a supply of the workpieces to said positioning means.

10. The apparatus set out in claim 8 wherein said apparatus further comprises a receiving bin for receiving said fasteners after deformation.

11. The apparatus set out in claim 8 wherein at least some of said raised portions of said first tool and some of said raised portions of said second tool exhibit different heights.

12. The apparatus set out in claim 8 wherein said raised portions of said first tool and said raised portions of said second tool successively increase in height.

13. The apparatus set out in claim 8 wherein said raised portions and said recessed portions of both said first tool face and said second tool face diagonally extend between said clamping surfaces.

14. The apparatus set out in claim 8 wherein said raised portions extend above the plane of said clamping surfaces and said recessed portions extend beneath the plane of said clamping surfaces.

15. The apparatus set out in claim 8 wherein one of said first and second tools is stationary and one of said first and second tools is movable.

16. The apparatus set out in claim 8 wherein one of said first and second tools has four raised portions.

17. The apparatus set out in claim 8 wherein one of said first and second tools has five raised portions.

18. The apparatus set out in claim 8 wherein said raised portions include planar end surfaces generally sloping toward said clamping surfaces.

19. The apparatus set out in claim 18 wherein said end surfaces are adjacent to said clamping surfaces and slope from ends of said raised portions and terminate at said clamping surfaces.

20. The apparatus set out in claim 8 wherein said recessed portions of said first and second tools include non-planar surfaces generally sloping downward from said clamping surfaces toward said lower apex of said recessed portions, at least a portion of said non-planar surfaces being defined in said clamping surfaces.

* * * * *